(12) United States Patent
Akiyama

(10) Patent No.: US 10,831,085 B2
(45) Date of Patent: Nov. 10, 2020

(54) WAVELENGTH CONVERSION ELEMENT, ILLUMINATOR, AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 39 days.

(21) Appl. No.: 16/290,244

(22) Filed: Mar. 1, 2019

(65) Prior Publication Data

US 2019/0271907 A1 Sep. 5, 2019

(30) Foreign Application Priority Data

Mar. 2, 2018 (JP) ................. 2018-037869

(51) Int. Cl.
*G03B 21/20* (2006.01)
*H04N 9/31* (2006.01)
*G02B 26/00* (2006.01)
*G02B 5/02* (2006.01)
*G02B 27/28* (2006.01)
*G03B 33/12* (2006.01)
*G02B 27/14* (2006.01)

(52) U.S. Cl.
CPC ......... *G03B 21/204* (2013.01); *G02B 5/0215* (2013.01); *G02B 5/0226* (2013.01); *G02B 26/008* (2013.01); *G02B 27/283* (2013.01); *G02B 27/285* (2013.01); *H04N 9/3158* (2013.01); *G02B 27/149* (2013.01); *G03B 21/208* (2013.01); *G03B 33/12* (2013.01)

(58) Field of Classification Search
CPC .............. G03B 21/204; G03B 21/2033; G03B 21/208; H04N 9/3152; H04N 9/3158; H04N 9/3161
See application file for complete search history.

(56) References Cited

U.S. PATENT DOCUMENTS

2014/0268063 A1 9/2014 Akiyama et al.
2015/0346579 A1* 12/2015 Hsieh ................ H04N 9/3114
362/84

FOREIGN PATENT DOCUMENTS

JP 2014-199401 A 10/2014

* cited by examiner

*Primary Examiner* — Ryan D Howard
(74) *Attorney, Agent, or Firm* — Oliff PLC

(57) ABSTRACT

A wavelength conversion element includes a wavelength conversion layer that has a light incident surface on which excitation light is incident and converts the excitation light in terms of wavelength into fluorescence and a plurality of light transmissive members each having a curved surface and disposed in the light incident surface, and the curved surfaces reflect the excitation light but transmit the fluorescence.

19 Claims, 9 Drawing Sheets

WAVELENGTH CONVERSION ELEMENT, ILLUMINATOR, AND PROJECTOR

BACKGROUND

1. Technical Field

The present invention relates to a wavelength conversion element, an illuminator, and a projector.

2. Related Art

In recent years, as an illuminator used in a projector, there is a known technology for generating white light by mixing fluorescence emitted from a phosphor excited with excitation light outputted from a solid-state light source with part of the excitation light (see JP-A-2014-199401, for example). In the illuminator, the reflectance of the excitation light is adjusted, for example, by forming a reflection film on an irregular surface formed on the light incident surface of the phosphor.

However, in the formation of the reflection film on the irregular surface described above, it is difficult to form a reflection layer that provides desired reflection characteristics. It is therefore difficult to adjust the reflectance of the excitation light to a predetermined value, and it is in turn difficult to generate desired color light.

SUMMARY

An advantage of some aspects of the invention is to provide a wavelength conversion element capable of generating desired color light. Another advantage of some aspects of the invention is to provide an illuminator including the wavelength conversion element. Another advantage of some aspects of the invention is to provide a projector including the illuminator.

According to a first aspect of the invention, a wavelength conversion element is provided. The wavelength conversion element includes a wavelength conversion layer that has a light incident surface on which excitation light is incident and converts the excitation light in terms of wavelength into fluorescence and a plurality of light transmissive members each having a curved surface and disposed in the light incident surface, and the curved surfaces reflect the excitation light but transmit the fluorescence.

In the first aspect described above, it is preferable that the curved surface of each of the light transmissive members is so provided as to protrude in a direction opposite a direction in which the excitation light incident on the light incident surface is incident.

In the first aspect described above, it is preferable that the curved surface of each of the light transmissive members is provided in the wavelength conversion layer.

In the first aspect described above, it is preferable that the light transmissive members are made of a material containing an aluminum oxide.

In the first aspect described above, it is preferable that the light transmissive members each have a spherical shape.

According to a second aspect of the invention, an illuminator is provided. The illuminator includes the wavelength conversion element according to the first aspect and a light source that outputs the excitation light.

In the second aspect described above, it is preferable that the illuminator further includes a rotary driver that rotates a base that supports the wavelength conversion layer around a predetermined axis of rotation, that the wavelength conversion layer is provided around the axis of rotation, and that reflectance of the excitation light is defined by the light transmissive members and a distribution of the reflectance is produced in a direction perpendicular to the axis of rotation.

In the second aspect described above, it is preferable that the illuminator further includes a mover that moves the base in a direction perpendicular to the axis of rotation, a detector that detects an amount of illumination light that is a combination of the reflected excitation light and the fluorescence, and a controller that controls the mover based on a result of the detection performed by the detector.

According to a third aspect of the invention, a projector is provided. The projector includes the illuminator according to the second aspect, a light modulator that modulates light from the illuminator in accordance with image information to form image light, and a projection system that projects the image light.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below in detail with reference to the drawings.

Figure 1:
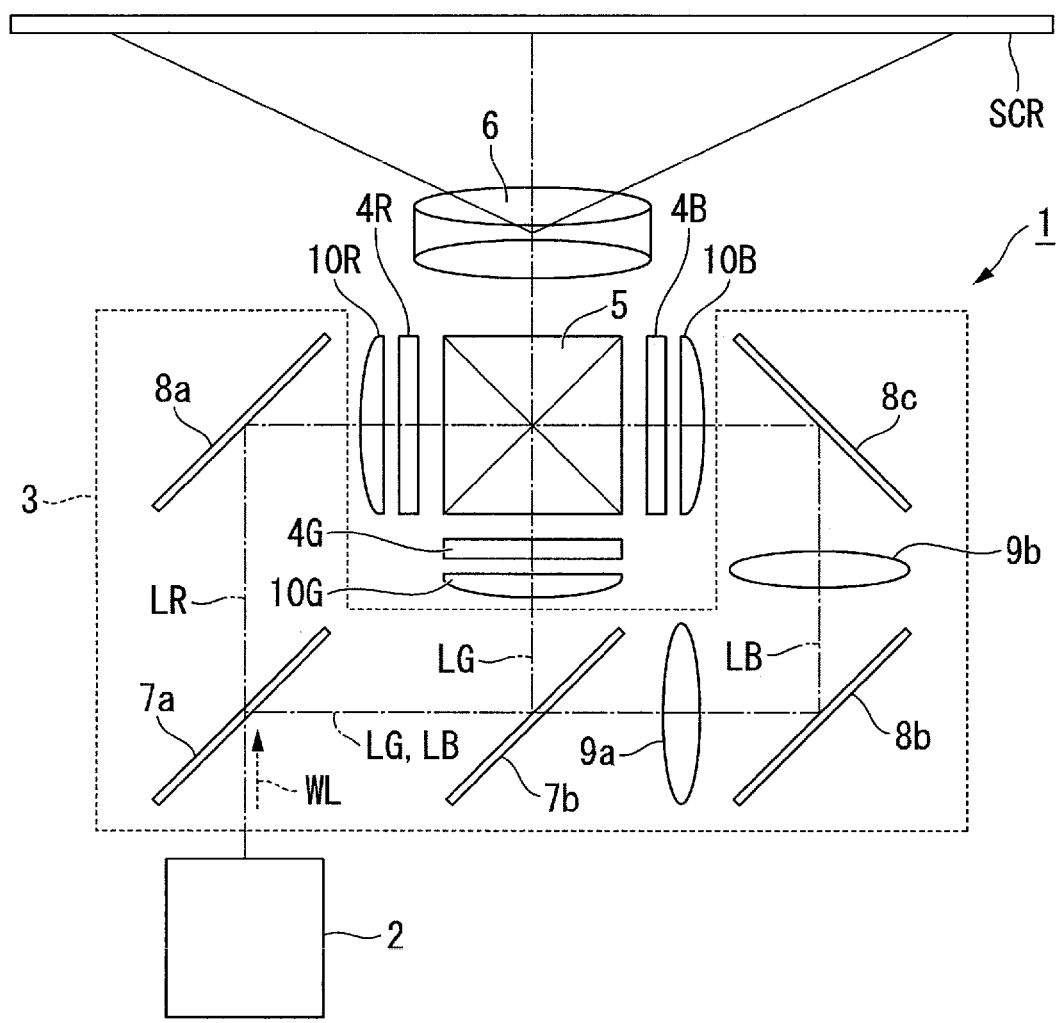
FIG. 1 is a schematic configuration diagram of a projector according to a first embodiment.

FIG. 1 is a schematic configuration diagram of the projector according to the present embodiment.

A projector 1 according to the present embodiment is a projection-type image display apparatus that displays a color image on a screen SCR, as shown in FIG. 1. The projector 1 uses three light modulators corresponding to the following color light fluxes: red light LR; green light LG; and blue light LB. The projector 1 uses semiconductor lasers, which each produce high-luminance, high-power light, as the light source of an illuminator 2.

The projector 1 generally includes the illuminator 2, a color separation system 3, a light modulator for red light 4R, a light modulator for green light 4G, a light modulator for blue light 4B, a light combining system 5, and a projection system 6.

The illuminator 2 outputs white illumination light WL toward the color separation system 3. The illuminator 2 uses a wavelength conversion element that is an embodiment of the invention and will be described later.

The color separation system 3 separates the illumination light WL outputted from the illuminator 2 into the red light LR, the green light LG, and the blue light LB. The color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a has the function of separating the illumination light WL outputted from the illuminator 2 into the red light LR, green light LG, and blue light LB. The first dichroic mirror 7a transmits the red light LR and reflects the green light LG and the blue light LB. The second dichroic mirror 7b has the function of separating the light reflected off the first dichroic mirror 7a into the green light LG and the blue light LB. The second dichroic mirror 7b reflects the green light LG and transmits the blue light LB.

The first reflection mirror 8a is disposed in the optical path of the red light LR. The first reflection mirror 8a reflects the red light LR having passed through the first dichroic mirror 7a toward the light modulator for red light 4R. The second reflection mirror 8b and the third reflection mirror 8c are disposed in the optical path of the blue light LB. The second reflection mirror 8b and the third reflection mirror 8c reflect the blue light LB having passed through the second dichroic mirror 7b toward the light modulator for blue light 4B. The green light LG is reflected off the second dichroic mirror 7b and travels toward the light modulator for green light 4G.

The first relay lens 9a and the second relay lens 9b are disposed in the optical path of the blue light LB and on the light exiting side of the second dichroic mirror 7b. The first relay lens 9a and the second relay lens 9b have the function of compensating optical loss of the blue light LB resulting from the fact that the optical path length of the blue light LB is longer than the optical path lengths of the red light LR and the green light LG.

The light modulator for red light 4R modulates the red light LR in accordance with image information to form image light corresponding to the red light LR. The light modulator for green light 4G modulates the green light LG in accordance with image information to form image light corresponding to the green light LG. The light modulator for blue light 4B modulates the blue light LB in accordance with image information to form image light corresponding to the blue light LB.

The light modulator for red light 4R, the light modulator for green light 4G, and the light modulator for blue light 4B are each formed, for example, of a transmissive liquid crystal panel. A pair of polarizers that are not shown are disposed on the light incident side and the light exiting side of each of the liquid crystal panels. The polarizers each transmit light linearly polarized in a specific direction.

A field lens 10R is disposed on the light incident side of the light modulator for red light 4R. A field lens 10G is disposed on the light incident side of the light modulator for green light 4G. A field lens 10B is disposed on the light incident side of the light modulator for blue light 4B. The field lens 10R parallelizes the red light LR to be incident on the light modulator for red light 4R. The field lens 10G parallelizes the greenlight LG to be incident on the light modulator for green light 4G. The field lens 10B parallelizes the blue light LB to be incident on the light modulator for blue light 4B.

The light combining system 5 combines the image light fluxes corresponding to the red light LR, the green light LG, and the blue light LB with one another and causes the combined image light to exit toward the projection system 6. The light combining system 5 is formed, for example, of a cross dichroic prism.

The projection system 6 is formed of a projection lens group including a plurality of projection lenses. The projection system 6 enlarges the combined image light from the light combining system 5 and projects the enlarged image light toward the screen SCR. An enlarged color image is thus displayed on the screen SCR.

Illuminator

Figure 2:
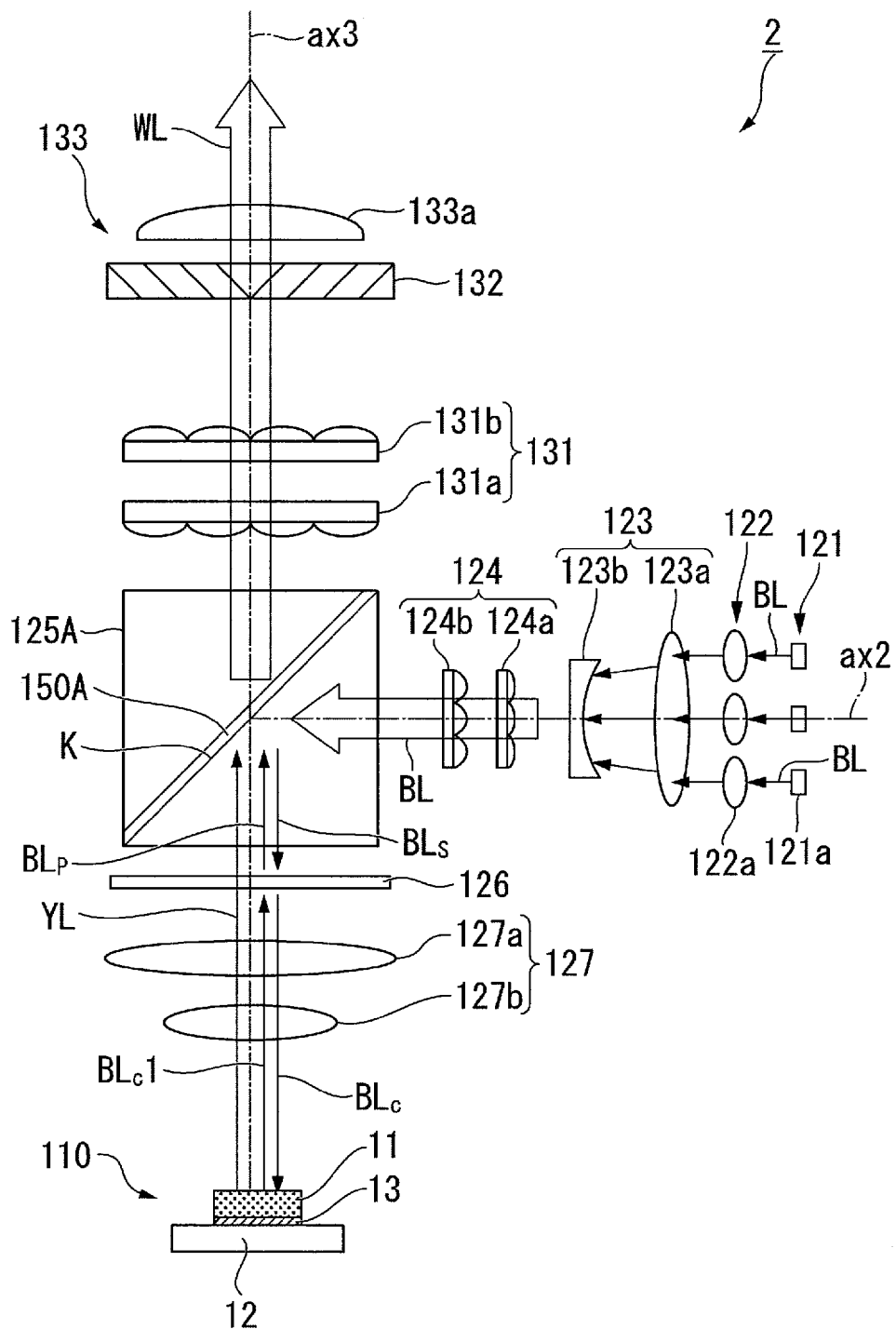
FIG. 2 shows a schematic configuration of an illuminator.

The illuminator 2 will subsequently be described. FIG. 2 shows a schematic configuration of the illuminator 2.

The illuminator 2 includes an array light source 121, a collimator system 122, an afocal system 123, a homogenizer system 124, an optical element 125A including a polarization separation element 150A, a retardation film 126, a pickup system 127, an optical integration system 131, a polarization conversion element 132, a superimposing system 133, and a wavelength conversion element 110, as shown in FIG. 2.

The array light source 121 is formed of a plurality of arranged semiconductor lasers 121a. Specifically, the plurality of semiconductor lasers 121a are arranged in an array in a plane perpendicular to the optical axis of the array light source 121. The number of semiconductor lasers 121a is not limited to a specific value. The semiconductor lasers 121a each output blue excitation light BL (light having intensity that peaks at wavelength in wavelength band ranging from 440 to 470 nm). The array light source 121 corresponds to the "light source" in the appended claims.

In the present embodiment, the optical axis of the array light source 121 is called an optical axis ax2. The optical axis of the light that exits out of the wavelength conversion element 110, which will be described later, is called an optical axis ax3. The optical axis ax2 and the optical axis ax3 are present in the same plane and perpendicular to each other.

The array light source 121, the collimator system 122, the afocal system 123, the homogenizer system 124, and the optical element 125A are arranged in the presented order along the optical axis ax2. On the other hand, the wavelength conversion element 110, the pickup system 127, the retardation film 126, the optical element 125A, the optical integration system 131, the polarization conversion element 132, and the superimposing system 133 are arranged in the presented order along the optical axis ax3.

In the present embodiment, the semiconductor lasers 121a in the array light source 121 are so arranged that the polarization direction of the excitation light BL outputted from each of the semiconductor lasers 121a coincides with the polarization direction of a polarized component (S-polarized component, for example) reflected off the polarization separation element 150A. The excitation light BL outputted from the array light source 121 enters the collimator system 122.

The collimator system 122 converts the excitation light BL outputted from the array light source 121 into a parallelized light flux. The collimator system 122 is formed, for example, of a plurality of collimator lenses 122a arranged in an array. The plurality of collimator lenses 122a are disposed in correspondence with the plurality of semiconductor lasers 121a.

The excitation light BL having passed through the collimator system 122 and having therefore been converted into the parallelized light enters the afocal system 123.

The afocal system 123 adjusts the size (spot diameter) of the excitation light BL and is formed, for example, of two afocal lenses 123a and 123b. The excitation light BL having passed through the afocal system 123 and having therefore been adjusted in terms of size enters the homogenizer system 124.

The homogenizer system 124 converts the optical intensity distribution of the excitation light BL into a uniform distribution (what is called top-hat distribution) in an illuminated region and is formed, for example, of a pair of multi-lens arrays 124a and 124b. The excitation light BL having exited out of the homogenizer system 124 then enters the optical element 125A.

The optical element 125A is formed, for example, of a dichroic prism having wavelength selectivity, and the dichroic prism has an inclining surface K, which inclines by 45° with respect to the optical axis ax2. The inclining surface K also inclines by 45° with respect to the optical axis ax3. The polarization separation element 150A having wavelength selectivity is provided along the inclining surface K.

The polarization separation element 150A has a polarization separation function of separating the excitation light BL, which belongs to a first wavelength band and is incident on the polarization separation element 150A, into the S-polarized light component and the P-polarized light component with respect to the polarization separation element 150A. The polarization separation element 150A reflects the S-polarized light component of the excitation light BL and transmits the P-polarized light component of the excitation light BL (blue light).

The polarization separation element 150A further has a color separation function of transmitting light that belongs to a second wavelength band different from the first wavelength band (fluorescence YL) out of the light incident on the polarization separation element 150A irrespective of the polarization state of the fluorescence YL. The optical element 125A does not necessarily have the shape of a prism, such as a dichroic prism, and may instead be a parallel-plate dichroic mirror.

Since the polarization direction of the excitation light BL coincides with the polarization direction of the S-polarized component, the excitation light BL incident on the polarization separation element 150A is then reflected as S-polarized excitation light BLs off the polarization separation element 150A toward the wavelength conversion element 110.

The retardation film 126 is formed of a quarter wave plate disposed in the optical path between the polarization separation element 150A and a phosphor 11 of the wavelength conversion element 110. The S-polarized (linearly polarized) excitation light BLs incident on the retardation film 126 is converted into circularly polarized excitation light BLc, which then enters the pickup system 127.

The pickup system 127 not only collects the excitation light BLc and directs the collected excitation light BLc toward the phosphor 11 but parallelizes light emitted from the phosphor 11, and the pickup system 127 is formed, for example, of pickup lenses 127a and 127b.

Figure 3:
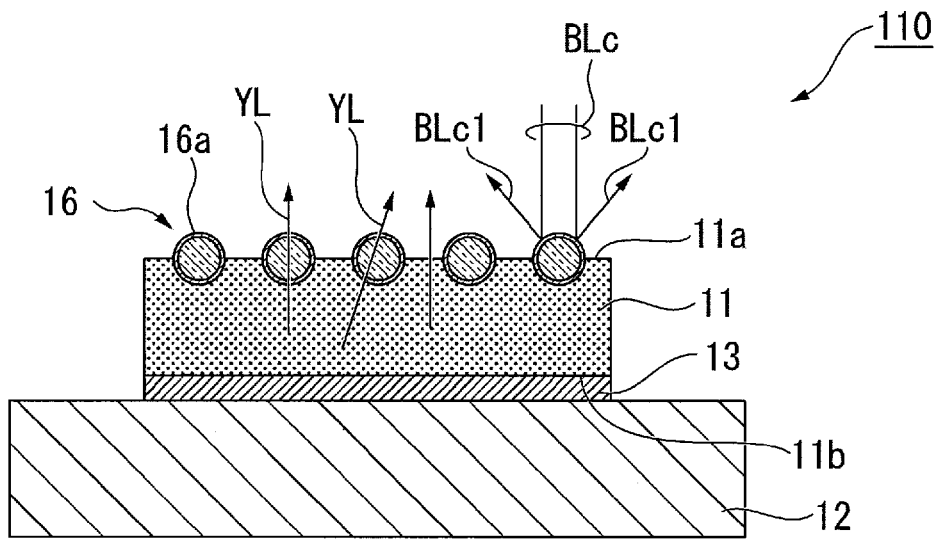
FIG. 3 is a cross-sectional view showing the configuration of key parts of a wavelength conversion element.
Figure 4:
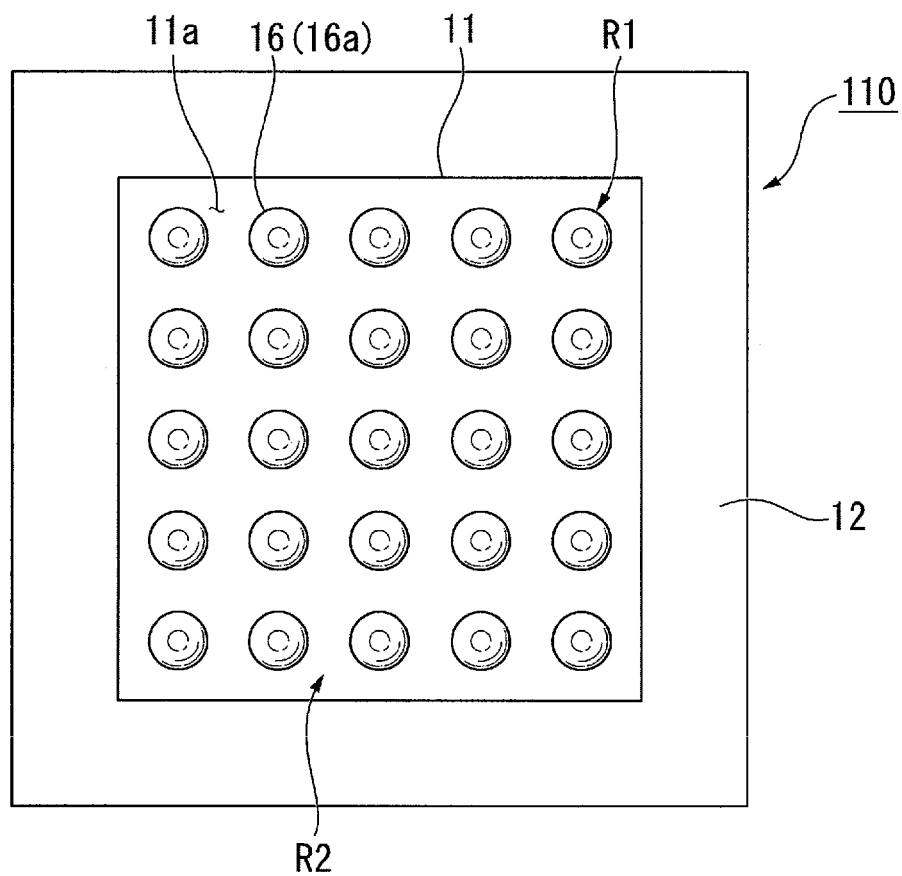
FIG. 4 is a top view of the wavelength conversion element.

FIG. 3 is a cross-sectional view showing the configuration of key parts of the wavelength conversion element 110, and FIG. 4 is a top view of the wavelength conversion element 110.

The wavelength conversion element 110 includes the phosphor 11, a support 12, which supports the phosphor 11, a reflection member 13, which is provided between the phosphor 11 and the support 12, and light transmissive members 16, as shown in FIG. 3. The phosphor 11 is a sintered element formed of a plurality of sintered YAG phosphor particles and has a light incident surface 11a, on which the excitation light BLs is incident. The phosphor 11 is excited with the excitation light BLs and emits the fluorescence YL having intensity that peaks at a wavelength in a wavelength region ranging, for example, from 500 to 700 nm. The phosphor 11 corresponds to the "wavelength conversion layer" in the appended claims.

A bottom surface 11b of the phosphor 11, which is the surface provided on the side opposite the light incident surface 11a, on which the excitation light BLs is incident, is fixed to the support 12 via an adhesive layer that is not shown. The support 12 preferably excels in thermal conductivity and is a plate-shaped member made of a metal in the present embodiment. The support 12 is, for example, a copper plate in the present embodiment. The material of the support 12 may instead be aluminum.

Part of the fluorescence YL generated in the phosphor 11 is reflected off the reflection member 13 and exits through the light incident surface 11a of the phosphor 11. The reflection member 13 preferably has high reflectance and is a metal deposited film (reflection film) in the present embodiment. The reflection film can, for example, be a silver film or an aluminum film. The fluorescence YL thus exits out of the phosphor 11 toward the pickup system 127.

In the present embodiment, the wavelength conversion element 110 includes a plurality of light transmissive members 16 disposed in the light incident surface 11a. The light transmissive members 16 each have a spherical shape and are each therefore entirely formed of a curved surface. The light transmissive members 16 are each so buried in the phosphor 11 that part of the light transmissive member 16 is exposed through the light incident surface 11a. The light transmissive members 16 are so provided as to protrude in the direction opposite the direction in which the excitation light BLs is incident on the light incident surface 11a (direction in which fluorescence YL exits). The light transmissive members 16 are therefore so configured that the side thereof facing the excitation light BLs incident on the light incident surface 11a is buried in the phosphor 11.

The light transmissive members 16 are made of a material containing an aluminum oxide ($Al_2O_3$). The material containing an aluminum oxide can, for example, be transparent sapphire or transparent alumina.

In the present embodiment, a dichroic film 16a is provided on the surface of each of the light transmissive members 16. The dichroic film 16a is so characterized in that it transmits the yellow fluorescence YL and reflects the blue excitation light BLc. The reflectance of the blue light (excitation light BLc) reflected off the dichroic film 16a is set, for example, at 99% or higher.

The excitation light BLc incident on the light incident surface 11a is reflected off the dichroic film 16a provided on the surface of each of the light transmissive members 16, which protrude above the light incident surface 11a. Since the dichroic film 16a has a convex curved surface that follows the shape of the surface of each of the light transmissive members 16 (curved shape), the excitation light BLc reflected off the dichroic film 16a scatters. The excitation light BLc reflected off the dichroic film 16a and formed of the scattered light is hereinafter referred to as blue scattered light BLc1.

A region of the light incident surface 11a that is the region where the light transmissive members 16 are provided is hereinafter referred to as a first region R1, and a region of the light incident surface 11a that is the region where no light transmissive members 16 are provided is hereinafter referred to as a second region R2.

The area of the first region R1 is defined by the areas of the light transmissive members 16 in a plan view thereof in the direction in which the excitation light BLs is incident, as shown in FIG. 4. In the present embodiment, the proportion of the first region R1 to the light incident surface 11a (area ratio) is so set as to range from 15 to 25%. It is noted that the higher the proportion described above, the greater the amount of blue scattered light BLc1.

The proportion of the first region R1 to the light incident surface 11a is defined by the surface density of the light transmissive members 16 provided in the light incident surface 11a. The surface density used herein is the proportion (ratio) of the sum of the areas where the light transmissive members 16 intersect the light incident surface 11a (cross-sectional areas of light transmissive members 16 taken by light incident surface 11a) to the area of the light incident surface 11a in the plan view or the density of the light transmissive members 16 in the light incident surface 11a, and the surface density can be adjusted, for example, by the number and size of light transmissive members 16 buried in the light incident surface 11a or the amount (depth) of light transmissive members 16 buried in the light incident surface 11a.

In the present embodiment, the amount of buried light transmissive members 16 is so adjusted that roughly at least half the volume of each of the spherical light transmissive members 16 is buried in the phosphor 11. The thus set amount of buried light transmissive members 16 can prevent the blue scattered light BLc1 from being excessively scattered by the surfaces (dichroic films 16a) of the light transmissive members 16, which protrude above the light incident surface 11a. The blue scattered light BLc1 therefore efficiently enters the pickup system 127. As a result, the excitation light can be used with improved efficiency.

In the present embodiment, since the light transmissive members 16 are arranged in a matrix in the light incident surface 11a, the blue scattered light BLc1 is generated roughly uniformly across the light incident surface 11a.

On the other hand, the excitation light BLc that enters the phosphor 11 via the second region R2 of the light incident surface 11a is converted into the fluorescence YL. The fluorescence YL directly or after reflected off the reflection member 13 travels toward the light incident surface 11a. Since the light transmissive members 16 and the dichroic films 16a transmit the fluorescence YL, the fluorescence YL exits both through the second region R2 and the first region R1 of the light incident surface 11a. The fluorescence YL therefore exits through the entire light incident surface 11a in a roughly uniform manner.

The blue scattered light BLc1 and the fluorescence YL enter the pickup system 127, where they are converted into parallelized light and then pass through the retardation film 126. The blue scattered light BLc1 is converted, when passing through the retardation film 126 again, into blue light BLp, which is incident as P-polarized light on the polarization separation element 150A. The blue light BLp passes through the polarization separation element 150A.

On the other hand, the fluorescence YL contained in the illumination light WL, which is non-polarized light, passes through the retardation film 126 and is incident on the polarization separation element 150A still in the form of non-polarized light. The fluorescence YL the passes through the polarization separation element 150A.

The blue light BLp and the yellow fluorescence YL having passed through the polarization separation element 150A as described above mix with each other into the illumination light (white light) WL. The illumination light WL passes through the polarization separation element 150A and then enters the optical integration system 131.

The optical integration system 131 divides the illumination light WL incident thereon into a plurality of thin light fluxes. The optical integration system 131 is formed, for example, of a first lens array 131a and a second lens array 131b. The first lens array 131a and the second lens array 131b are each formed of a plurality of lenses arranged in an array.

The illumination light WL having exited out of the optical integration system 131 enters the polarization conversion element 132. The polarization conversion element 132 aligns the polarization directions of the components of the illumination light WL. The polarization conversion element 132 is formed, for example, of polarization separation films and retardation films. The polarization conversion element 132, which aligns the polarization direction of the fluorescence YL, which is non-polarized light, with the polarization direction of the blue light BL1, converts one of the polarized components into the other, for example, the P-polarized component into the S-polarized component.

The illumination light WL having passed through the polarization conversion element 132 enters a superimposing lens 133a. The superimposing lens 133a superimposes the plurality of thin light fluxes having exited out of the polarization conversion element 132 with one another on an illumination target object. The illumination target object can thus be uniformly illuminated. The superimposing system 133 is formed of the optical integration system 131, which is formed of the first lens array 131a and the second lens array 131b, and the superimposing lens 133a.

Since the divergence angle of the fluorescence YL, which exits through the light incident surface 11a, is typically large, the fluorescence YL tends to have a large light flux diameter. In the present embodiment, the blue scattered light BLc1 exits as scattered light through the light incident surface 11a, as shown in FIG. 3. The illuminance distribution of the blue scattered light BLc1, which has a large light flux diameter, therefore approaches the illumination distribution of the fluorescence YL. According to the present embodiment, since the blue scattered light BLc1 (blue light BLp) and the fluorescence YL, the light flux diameters of which differ from each other only by a small amount, exit through the light incident surface 11a, the illumination light WL, which is the combination of the blue light BLp and the fluorescence YL, forms white light having a small amount of color unevenness.

As described above, the wavelength conversion element 110 according to the present embodiment allows the reflectance of the blue scattered light BLc1 to be readily and precisely adjusted by changing the proportion of the light transmissive members 16 (dichroic films 16a) exposed through the light incident surface 11a of the phosphor 11, that is, the ratio between the first region R1 and the second region R2 of the light incident surface 11a. The proportions of the blue scattered light BLc1 and the fluorescence YL, which form the illumination light WL, can thus be adjusted, whereby the color tone (white balance) of the illumination light WL can be readily and precisely adjusted. The wavelength conversion element 110 according to the present embodiment can therefore generate desired color light (illumination light WL).

Further, in the wavelength conversion element 110 according to the present embodiment, the dichroic film 16a formed on the curved surface of each of the light transmissive members 16, which protrude above the light incident surface 11a, allows scattered reflection of the excitation light BLc.

Moreover, in the wavelength conversion element 110 according to the present embodiment, the light transmissive members 16, which are made of a material containing an aluminum oxide ($Al_2O_3$), can be light transmissive members 16 that have optical transparency and transmit the fluorescence YL.

Still further, in the wavelength conversion element 110 according to the present embodiment, the light transmissive members 16, which each have a spherical shape, can be light transmissive members 16 each having a spherical surface as a curved surface, and the excitation light BLc reflected off the dichroic film 16a formed on the spherical surface is scattered light.

The illuminator 2 according to the present embodiment, which includes the wavelength conversion element 110 described above, can radiate the illumination light WL having a desired color tone. The projector 1 according to the present embodiment, which includes the illuminator 2 described above, can display an image having a desired color tone.

The wavelength conversion element 110 according to the present embodiment are formed, for example, as follows: The light transmissive members 16 are buried in a phosphor material formed by molding YAG phosphor particles; recesses are formed; the light transmissive members 16 are then temporarily removed; and the phosphor material is sintered. After the sintering, the light transmissive members 16 are disposed in the recesses again. The wavelength conversion element 110 according to the present embodiment is thus completed.

Second Embodiment

An illuminator according to a second embodiment will subsequently be described. Members and components common to those in the first embodiment have the same reference characters and will not be described in detail.

Figure 5:
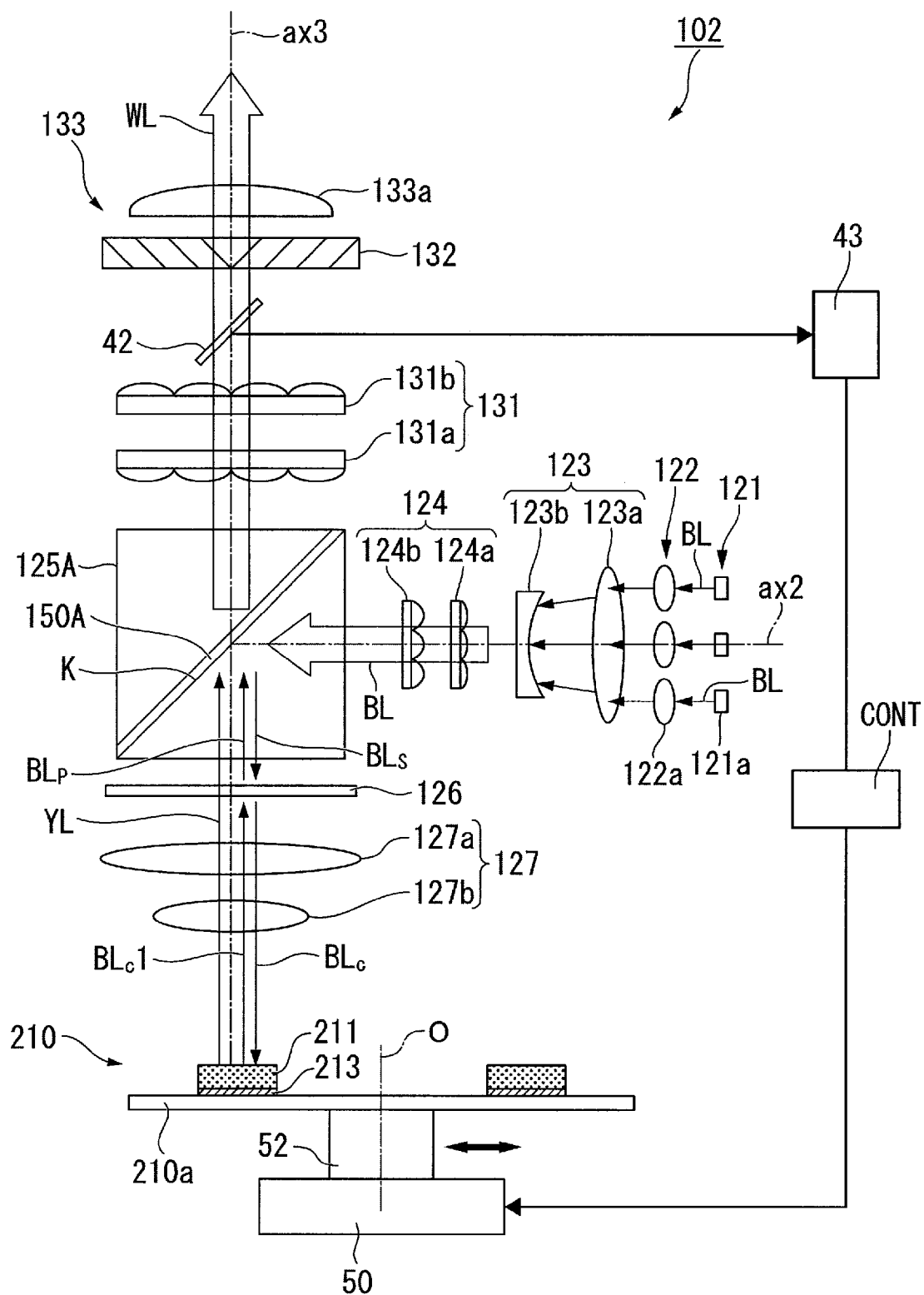
FIG. 5 shows a schematic configuration of an illuminator according to a second embodiment.

FIG. 5 shows a schematic configuration of an illuminator 102 according to the present embodiment. The illuminator 102 according to the present embodiment includes the array light source 121, the collimator system 122, the afocal system 123, the homogenizer system 124, the optical element 125A, the retardation film 126, the pickup system 127, the optical integration system 131, the polarization conversion element 132, the superimposing system 133, a phosphor wheel 210, a light quantity monitoring mirror 42, a sensor unit (detector) 43, a mover 50, and a controller CONT, as shown in FIG. 5.

In the present embodiment, the phosphor wheel 210 is what is called a reflective rotary fluorescing plate. The phosphor wheel 210 corresponds to the "wavelength conversion element" in the appended claims.

The phosphor wheel 210 includes a substrate 210a, which is formed of a circular plate, a phosphor 211, which is provided on the substrate 210a, a reflection member 213, which is provided between the phosphor 211 and the substrate 210a, and a motor (rotary driver) 52, which rotates the substrate 210a around a predetermined axis of rotation O passing through the center of the substrate 210a.

The phosphor 211 is formed in a ring shape around the axis of rotation O. The phosphor 211 in the present embodiment is formed, for example, of a resin binder made, for example, of silicon and a plurality of YAG phosphor particles dispersed in the resin binder. The phosphor particles may be made of one material or may be a mixture of particles made of two or more materials. The phosphor 211 is excited with the excitation light BLs and emits the fluorescence YL having intensity that peaks at a wavelength in the wavelength region ranging, for example, from 500 to 700 nm.

Part of the fluorescence YL generated in the phosphor 211 is reflected off the reflection member 213 and exits through a light incident surface 211a of the phosphor 211. The reflection member 213 preferably has high reflectance and is a metal deposited film (reflection film) in the present embodiment. The reflection film can, for example, be a silver film or an aluminum film. The fluorescence YL thus exits out of the phosphor 211 toward the pickup system 127.

The substrate 210a is a circular plate, but not necessarily. In the present embodiment, the substrate 210a corresponds to the "base" in the appended claims, the phosphor 211 corresponds to the "wavelength conversion layer" in the appended claims, and the motor 52 corresponds to the "rotary driver" in the appended claims.

The substrate 210a rotates at a predetermined rotary speed when the projector 1 is used. Continuous incidence of the excitation light BLc on a specific region of the phosphor 211 is thus avoided, whereby the life of the phosphor 211 is prolonged.

In the illuminator 102 according to the present embodiment, the light quantity monitoring mirror 42 is provided in the optical path between the optical integration system 131 and the polarization conversion element 132. The light quantity monitoring mirror 42 is a half-silvered mirror and so disposed as to incline by 45° with respect to the optical axis ax3. The light quantity monitoring mirror 42 transmits part of the light incident thereon and reflects the remainder. The light having passed through the light quantity monitoring mirror 42 enters the polarization conversion element 132, and the light having been reflected off the light quantity monitoring mirror 42 enters the sensor unit 43.

Figure 6:
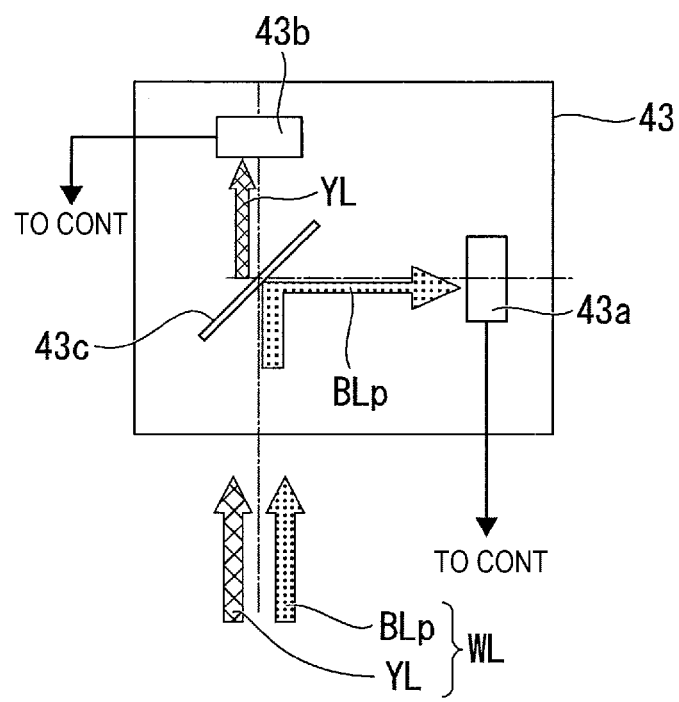
FIG. 6 shows a schematic configuration of a sensor unit.
Figure 7:
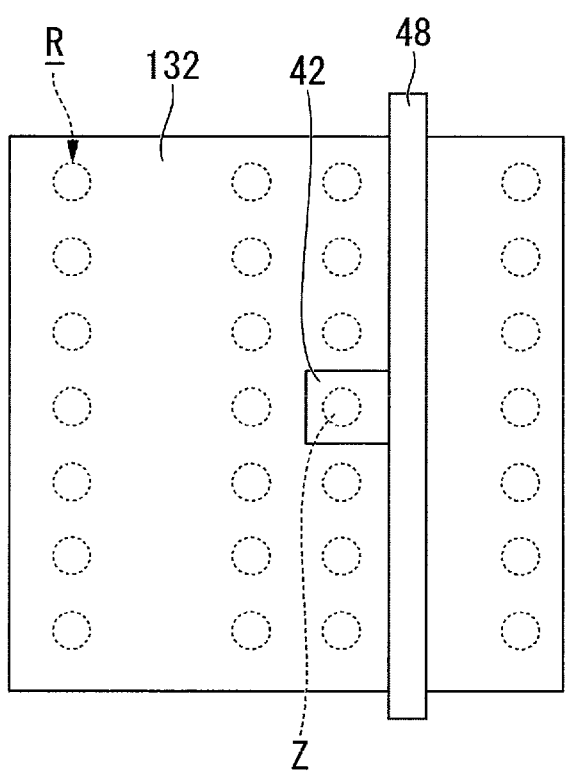
FIG. 7 is a front view showing the arrangement of a mirror with respect to a polarization conversion element.

FIG. 6 shows a schematic configuration of the sensor unit 43. FIG. 7 is a front view showing the arrangement of a mirror with respect to the polarization conversion element.

The sensor unit 43 includes a first sensor 43a, a second sensor 43b, and a dichroic mirror 43c, as shown in FIG. 6. The dichroic mirror 43c is formed of a dielectric multilayer film and is optically characterized in that it transmits the fluorescence YL out of the illumination light WL and reflects the blue light BLp out of the illumination light WL.

The first sensor 43a measures the amount of blue light BLp reflected off the dichroic mirror 43c out of the illumination light WL reflected off the light quantity monitoring mirror 42. The second sensor 43b measures the amount of fluorescence YL having passed through the dichroic mirror 43c out of the illumination light WL reflected off the light quantity monitoring mirror 42. The first sensor 43a and the second sensor 43b transmit the results of the measurement to the controller CONT. The controller CONT controls the motion of the phosphor wheel 210, as will be described later, based on the results of the measurement performed by the first sensor 43a and the second sensor 43b.

The light quantity monitoring mirror 42 is held by a holding member 48, which is so disposed as not to interfere with light incidence regions R of the polarization conversion element 132, as shown in FIG. 7. The light incidence regions R of the polarization conversion element 132 are the regions on which the plurality of thin light fluxes having exited out of the optical integration system 131 are incident.

The second lens array 131b is optically conjugate with the array light source 121. A secondary light source image Z of the excitation light BL is therefore formed on each of the plurality of lenses provided in the second lens array 131b. The light quantity monitoring mirror 42 is so disposed that one of the plurality of secondary light source images Z formed on the second lens array 131b is incident on the light quantity monitoring mirror 42. Illuminance unevenness therefore occurs on none of the light modulator for red light 4R, the light modulator for green light 4G, and the light modulator for blur light 4B, which are each the illuminated region. Therefore, in a case where a decrease in illuminance corresponding to one of the secondary light source images can be permitted, the light quantity monitoring mirror 42 may not be a half-silvered mirror.

The present embodiment has been described with reference to the case where the light quantity monitoring mirror 42 is disposed in the optical path between the optical integration system 131 and the polarization conversion element 132. The light quantity monitoring mirror 42 may instead be disposed in the optical path between the polarization conversion element 132 and the superimposing lens 133a.

Figure 8:
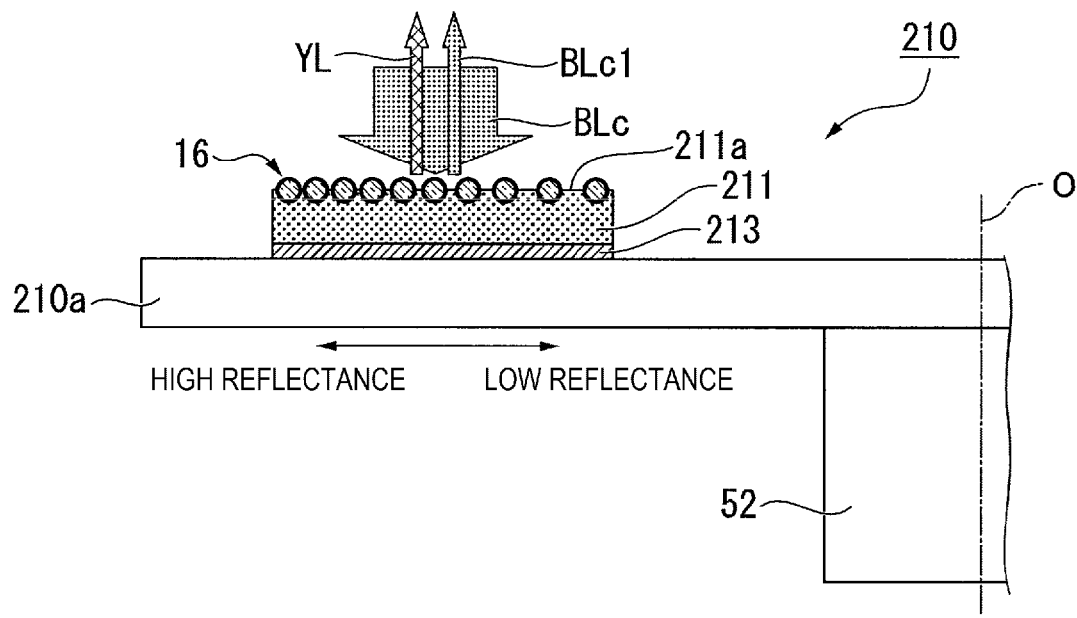
FIG. 8 is a cross-sectional view of the configuration of key parts of a phosphor wheel.

The phosphor wheel 210 will subsequently be described in detail. FIG. 8 is a cross-sectional view showing the configuration of key parts of the phosphor wheel 210, and FIG. 9 is a top view showing the configuration of the key parts of the phosphor wheel 210.

A plurality of light transmissive members 16 are disposed in a light incident surface 211a of the phosphor 211, as shown in FIG. 8. In the phosphor 211 in the present embodiment, the proportion of the region where the light transmissive members 16 are disposed (first region R1 shown in FIG. 4) to the light incident surface 211a changes in the radial direction of the substrate 210a (direction perpendicular to the axis of rotation O). That is, in the phosphor wheel 210, the proportion of the region where the light transmissive members 16 are disposed (first region R1 shown in FIG. 4) to the light incident surface 211a changes in the direction perpendicular to the axis of rotation O and extending along the light incident surface 211a.

Figure 9:
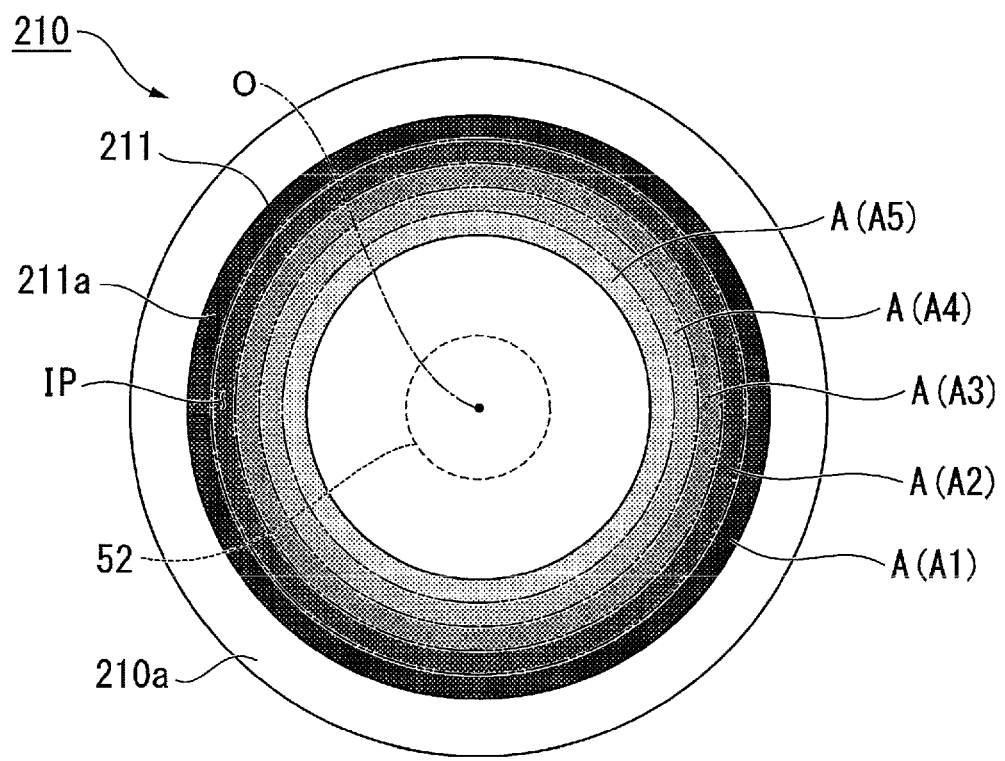
FIG. 9 is a top view showing the configuration of the key parts of the phosphor wheel.

It is now assumed in the phosphor wheel 210 that the light incident surface 211a of the phosphor 211 has a plurality of ring-shaped regions A around the axis of rotation O of the substrate 210a, as shown in FIG. 9. Since the phosphor wheel 210 is rotated by the motor 52, the trajectory of a light incident position IP, on which the excitation light BLc is incident on the light incident surface 211a, forms a circle around the axis of rotation O of the substrate 210a.

In the present embodiment, the proportion of the region where the light transmissive members 16 are disposed (first region R1) to the light incident surface 211a (hereinafter simply referred to as proportion) is smaller in a ring-shaped region A closer to the inner circumference of the substrate 201a than in a ring-shaped region A closer to the outer circumference of the substrate 201a.

Specifically, in the five ring-shaped regions A shown in FIG. 9 (hereinafter referred to as first ring-shaped region A1 to fifth ring-shaped region A5), the proportion described above changes by an increment of 5% over a range from 10% to 30%. That is, in FIG. 9, the five ring-shaped regions A are configured as follows: In the first ring-shaped region A1, which is closest to the outer circumference of the substrate 210a, the proportion of the region where the light transmissive members 16 are disposed (first region R1) to the first ring-shaped region A1 of the light incident surface 211a is 30%; in the fifth ring-shaped region A5, which is closest to the inner circumference of the substrate 210a, the proportion of the region where the light transmissive members 16 are disposed (first region R1) to the fifth ring-shaped region A5 of the light incident surface 211a is 10%; and in the second ring-shaped region A2, the third ring-shaped region A3, and the fourth ring-shaped region A4, which are located between the first ring-shaped region A1 and the fifth ring-shaped region A5, the proportions are 25%, 20%, and 15%, respectively. The proportions described above in the first ring-shaped region A1 to the fifth ring-shaped region A5 are adjusted by the surface density of the light transmissive members 16 provided in the light incident surface 211a. The surface density is the proportion (ratio) of the sum of the areas where the light transmissive members 16 intersect the light incident surface 211a (cross-sectional areas of light transmissive members 16 taken by light incident surface 211a) to the area of the light incident surface 211a in the plan view or the density of the light transmissive members in the light incident surface 211a, and the surface density can be adjusted, for example, by the number and size of light transmissive members 16 buried in the light incident surface 211a or the amount (depth) of light transmissive members 16 buried in the light incident surface 211a.

An increase in the proportions described above is equivalent to an increase in the proportion of the blue scattered light BLc1 to the light outputted from the phosphor wheel 210. That is, the phosphor 211 in the present embodiment has a reflectance distribution characterized in that the reflectance of the excitation light BLc increases from the inner side toward the outer side of the light incident surface 211a, as shown in FIGS. 8 and 9. Therefore, the reflectance of the excitation light BLc is the lowest on the inner circumferential side of the light incident surface 211a (fifth ring-shaped region A5 of light incident surface 211a), and the reflectance of the excitation light BLc is the highest on the outer circumferential side of the light incident surface 211a (first ring-shaped region A1 of light incident surface 211a). In FIG. 9, the distribution of the reflectance of the excitation light BLc on the light incident surface 211a is expressed by the density of dot hatching.

In the present embodiment, the mover 50 translates the phosphor wheel 210 in a direction that intersects the optical axis ax3. That is, the mover 50 translates the phosphor wheel 210 in a direction perpendicular to the axis of rotation O of the substrate 210a and extending along the light incident surface 211a (radial direction of substrate 210a). The mover 50 is controlled by the controller CONT. The controller CONT drives the mover 50 based on the results transmitted from the sensor unit 43 (first sensor 43a and second sensor 43b), as described above. The mover 50 then translates the phosphor wheel 210 in a predetermined direction.

The mover 50 translates the phosphor wheel 210 in such a way that the reflectance of the excitation light BLc in the light incident position IP, on which the excitation light BLc is incident, changes.

It is now assumed that the light incident position IP at a certain point of time is located in the first ring-shaped region A1. It is further assumed that the mover 50 translates the phosphor wheel 210 in a predetermined direction in such a way that the light incident position IP is located in the second ring-shaped region A2. In FIG. 9, the light incident position IP is located in the second ring-shaped region A2. The reflectance of the excitation light BLc in the first ring-shaped region A1 is higher than the reflectance of the excitation light BLc in the second ring-shaped region A2.

Assume now a case where the amount of light outputted from any of the semiconductor lasers 121a decreases due to a time-course change during the use of the projector. An aspect of the control against a color balance shift that occurs in this case will be described with reference to the flowchart of FIG. 10.

When the power of any of the semiconductor lasers 121a decreases (step S1 in FIG. 10), the amount of excitation light BL, which excites the phosphor 211, decreases accordingly. A decrease in the amount of excitation light BL is equivalent to a decrease in the optical density (amount of light per unit area) of the excitation light BL (step S2 in FIG. 10). The phosphor 211 is typically characterized in that a decrease in the optical density of the excitation light incident on the phosphor 211 causes an increase in the conversion efficiency in the conversion of the excitation light into the fluorescence. Therefore, even when the amount of excitation light BL decreases, but when the amount of increase in the fluorescence YL resulting from an increase in the conversion efficiency is greater than the amount of decrease in the fluorescence YL resulting from the decrease in the amount of excitation light BL, the amount of fluorescence YL emitted from the phosphor 211 increases (step S3 in FIG. 10). The description is made of the case where the amount of fluorescence YL increases. It is, however, noted that the amount of fluorescence YL decreases in some cases. The color balance deteriorates in both the cases.

The amounts of excitation light BLc and blue light BLp both decrease as the power of any of the semiconductor lasers 121a decreases. However, since the conversion efficiency of the phosphor 211 increases, the amount of fluorescence YL relatively increases with respect to the blue light BLp (step S4 in FIG. 10). As a result, the ratio between the amount of blue light BLp and the amount of yellow fluorescence YL changes, and the color balance of the illumination light WL deteriorates as compared with the color balance before the time-course change (in initial state at the start of use of projector) (step S5 in FIG. 10). Specifically, since the amount of yellow fluorescence YL relatively increases with respect to the amount of blue light BLp, the illumination light WL changes to yellowish white light.

Figure 10:
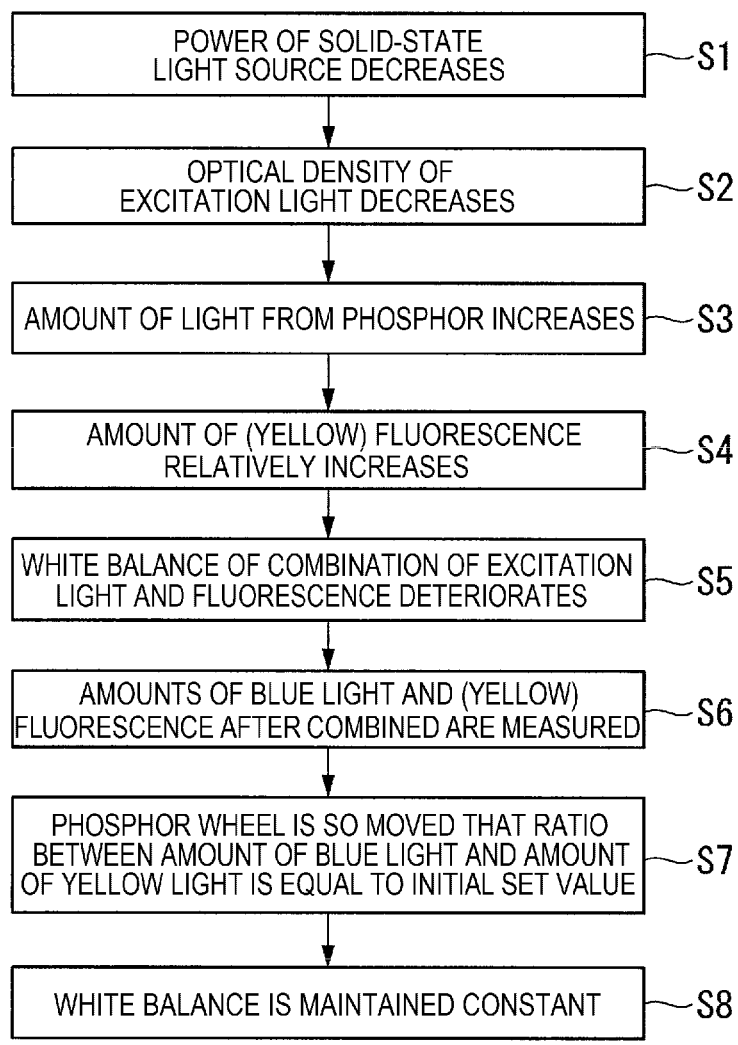
FIG. 10 is a flowchart for describing a method for adjusting color balance.

In the present embodiment, the sensor unit 43 measures the amount (intensity) of blue light BLp and the amount (intensity) of yellow fluorescence YL contained in the light extracted via the light quantity monitoring mirror (step S6 in FIG. 10). The result of the measurement performed by the sensor unit 43 is transmitted to the controller CONT.

The controller CONT stores, as a reference value, the ratio between the blue light intensity and the yellow light intensity (intensity ratio) determined based on initial intensity values at the point of time when the use of the projector 1 starts. The controller CONT compares the current intensity ratio detected with the sensor unit 43 with a reference value. In a case where the difference between the current intensity ratio and the reference value does not fall within a tolerance range, the mover 50 translates the phosphor wheel 210 to move the light incident position IP, on which the excitation light BL is incident, into another region having different reflectance of the excitation light BLc so that the intensity ratio approaches the reference value (step S7 in FIG. 10). For example, the light incident position IP, on which the excitation light BL is incident, is moved from any of the first ring-shaped region A1 to the fifth ring-shaped region A5 to another.

As described above, changing the reflectance of the excitation light BLc in the light incident position IP allows adjustment of the proportions of the fluorescence YL and the blue light BLp, which form the illumination light WL.

Specifically, to increase the amount of blue light BLp and decrease the amount of fluorescence YL, which is yellow light, the amount of blue scattered light BLc1 reflected off the light transmissive members 16 may be increased. That is, the phosphor wheel 210 is so translated that the excitation light BLc is incident on a ring-shaped region A where the reflectance of the excitation light BLc is higher.

As a result, the amount of blue scattered light BLc1 reflected off the light transmissive members 16 increases, whereby the amount of fluorescence YL emitted from the phosphor 211 relatively decreases, and the amount of blue light BLp relatively increases. The illumination light WL therefore becomes closer to white light than in the case where the color balance of the illumination light WL deteriorates, whereby the color balance can be improved (step S8 in FIG. 10).

On the other hand, to decrease the amount of blue light BLp and increase the amount of fluorescence YL, which is yellow light, the amount of blue scattered light BLc1 reflected off the light transmissive members 16 may be decreased. That is, the phosphor wheel 210 is so translated that the excitation light BLc is incident on a ring-shaped region A where the reflectance of the excitation light BLc is lower.

As a result, the amount of blue scattered light BLc1 reflected off the light transmissive members 16 decreases, whereby the amount of fluorescence YL emitted from the phosphor 211 relatively increases, and the amount of blue light BLp relatively decreases. The illumination light WL therefore becomes closer to white light than in the case where the color balance of the illumination light WL deteriorates, whereby the color balance can be improved (step S8 in FIG. 10).

In the above description, the phosphor wheel 210 is so translated that the excitation light BLc is incident on a ring-shaped region A where the reflectance of the excitation light BLc is higher to increase the amount of blue light BLp and decrease the amount of fluorescence YL.

However, the phosphor 211 is characterized in that a decrease in the optical density of the excitation light incident on the phosphor 211 causes an increase in the conversion efficiency, as described above. The amount of fluorescence YL therefore does not necessarily decrease by the amount of decrease in the amount of excitation light incident on the phosphor 211. Therefore, the amount of change in the position on which the excitation light BLc is incident and the direction of the change may be set in accordance with the optical density of the excitation light BLc currently incident on the phosphor 211.

As the timing when the color balance is adjusted, the measurement of the blue light intensity and the yellow light intensity and the translation of the phosphor wheel 210 are desirably performed, for example, immediately after the projector 1 is powered on. The configuration in which the adjustment is performed immediately after the projector 1 is powered on allows a user to hardly recognize a change in the color tone of an image. Performing the adjustment of the color balance only immediately after the projector 1 is powered on, however, cannot handle a case where the color balance deteriorates during the use of the projector 1. The color balance may therefore be adjusted at predetermined time intervals even during the use of the projector 1.

As described above, the phosphor wheel 210 in the present embodiment, which includes the phosphor 211, which reflects the excitation light BLc in accordance with the reflectance distribution set in a predetermined direction on the light incident surface 211a (radial direction of substrate 210a), allows adjustment of the light incident position IP, where the excitation light BL is incident on the phosphor 211, whereby the color tone (color balance) of the illumination light WL formed of the fluorescence YL and the blue light BLp can be readily and precisely adjusted. The phosphor wheel 210 in the present embodiment therefore allows generation of illumination light WL formed of desired color light.

The illuminator 102 according to the present embodiment, in which the reflectance distribution is set in the radial direction of the substrate 210a, allows the color balance of the illumination light WL to be readily and reliably adjusted by moving the position on which the excitation light BLc is incident in the radial direction.

Further, a change in the color balance can be reduced by controlling the position where the excitation light BL is incident on the light incident surface 211a based on the blue light intensity and the yellow light intensity measured with the sensor unit 43.

Since the light quantity monitoring mirror 42 extracts part of the plurality of secondary light source images for the intensity measurement, the color balance can be precisely adjusted with no illuminance unevenness on the light modulator for red light 4R, the light modulator for green light 4G, and the light modulator for blue light 4B.

The projector according to the present embodiment, which includes the illuminator 102 described above, can perform display with a small change in the color balance.

Figure 11:
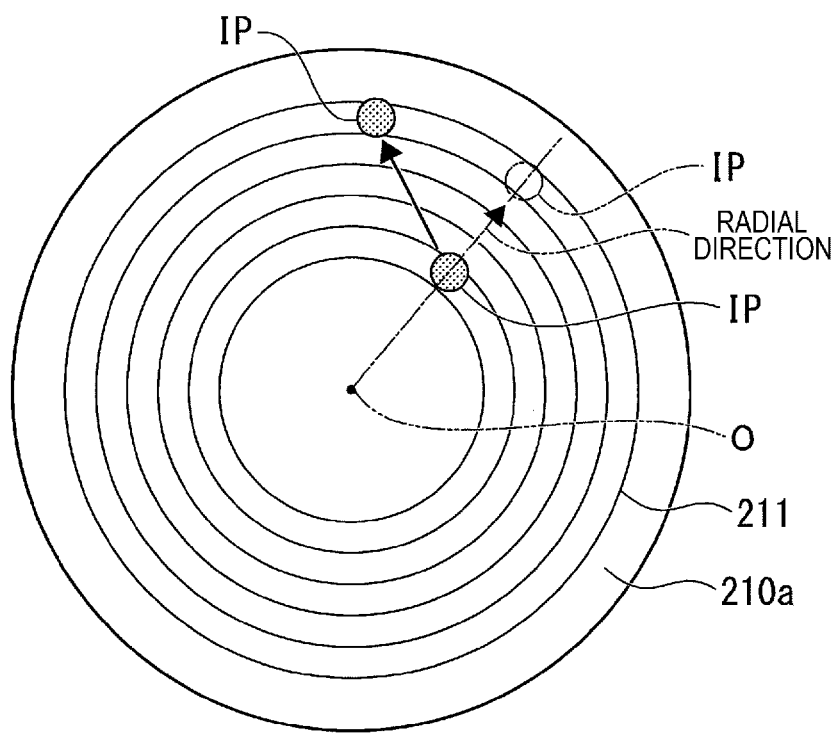
FIG. 11 describes another method for moving the position on which excitation light is incident.

In the present embodiment, the light incident position IP, on which the excitation light is incident, is moved in the radial direction of the substrate 210a, as indicated by the dotted chain line in FIG. 11, but the direction in which the light incident position IP, on which the excitation light is incident, is moved with respect to the substrate 210a is not limited to the radial direction. For example, the light incident position IP may be so moved that the distance between the light incident position IP and the axis of rotation O, which passes through the center of the substrate 210a, changes. The reason for this is that since the light incident surface 211a has the reflectance distribution in the radial direction of the substrate 210a, moving the light incident position IP in such a way that the distance to the axis of rotation O changes causes a change in the reflectance of the excitation light in the light incident position IP. In FIG. 11, the spot diameter in the light incident position IP, on which the excitation light is incident, is enlarged for ease of illustration.

An example of a method for manufacturing the phosphor 211 in the present embodiment will now be described. For example, a phosphor material molded in a ring shape is so prepared that a plurality of YAG phosphor particles are dispersed in a resin binder made, for example, of silicon, and the light transmissive members 16 are pushed into the phosphor material and buried to a predetermined depth. Specifically, the number and size of light transmissive members 16 to be buried or the amount (depth) of light transmissive members 16 to be buried is adjusted as appropriate for each of the ring-shaped regions A. For example, in a case where the size of the light transmissive members 16 to be buried is fixed, the number of light transmissive members 16 to be buried may be greater in a ring-shaped region A located closer to the outer circumference of the substrate 210a.

Finally, the resin binder is hardened. The phosphor 211 with the light incident surface 211a having the first ring-shaped region A1 to the fifth ring-shaped region A5 described above is thus manufactured.

In the present embodiment, the proportion of the region where the light transmissive members 16 are disposed (first region R1) to the light incident surface 211a is smaller in a ring-shaped region A located closer to the inner circumference of the substrate 210a than in a ring-shaped region A located closer to the outer circumference of the substrate 210a, but the formation of the ring-shaped regions A is not limited to the formation described above.

That is, the reflectance of the excitation light BLc may be the highest on the inner circumference side of the substrate 210a (fifth ring-shaped region A5 of light incident surface 211a), and the reflectance of the excitation light BLc may be the lowest on the outer circumference side of the substrate 210a (first ring-shaped region A1 of light incident surface 211a).

In this case, the five ring-shaped regions A (first ring-shaped region A1 to fifth ring-shaped region A5) are configured as follows: The proportion of the region where the light transmissive members 16 are disposed (first region R1) to the first ring-shaped region A1 of the light incident surface 211a is 10%; the proportion of the region where the light transmissive members 16 are disposed (first region R1) to the fifth ring-shaped region A5 of the light incident surface 211a, which is the innermost ring-shaped region of the light incident surface 211a, is 30%; and the proportions in the second ring-shaped region A2, the third ring-shaped region A3, and the fourth ring-shaped region A4 located between the first ring-shaped region A1 and the fifth ring-shaped region A5 are 15%, 20%, and 25%, respectively.

The invention is not limited to the contents of the embodiments described above but can be changed as appropriate to the extent that the change does not depart from the substance of the invention. For example, in the embodiments described above and variations described below, an antireflection film (AR coat film) may be provided on the light incident surface of the phosphor. The antireflection film is provided in a region of the light incident surface that is the region where no light transmissive members 16 are provided (second region R2) and optically characterized in that it transmits both the excitation light BLc and the fluorescence YL.

First Variation

A wavelength conversion element according to a first variation will subsequently be described. The present variation relates to a variation of the wavelength conversion element 110 according to the first embodiment. Components common to those in the first embodiment have the same reference characters and will not be described in detail.

Figure 12:
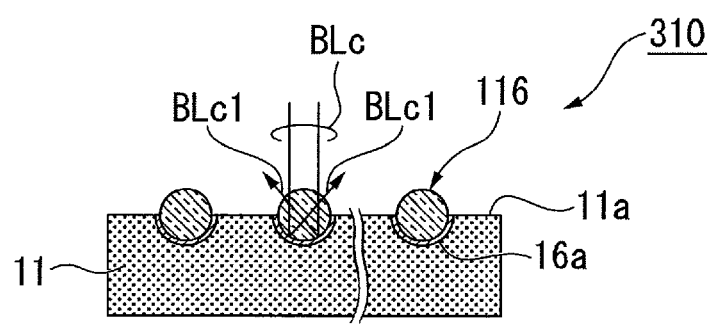
FIG. 12 is a cross-sectional view showing the configuration of key parts of a wavelength conversion element according to a first variation.

FIG. 12 is a cross-sectional view showing the configuration of key parts of a wavelength conversion element 310 according to the first variation.

The wavelength conversion element 310 according to the first variation includes a plurality of light transmissive members 116 in the light incident surface 11a of the phosphor 11, as shown in FIG. 12. The light transmissive members 116 are made of the same material of which the light transmissive members 16 in the first embodiment are made.

The dichroic film 16a is provided on part of the surface of each of the light transmissive members 116. The dichroic film 16a is provided on a portion of each of the light transmissive members 116 that is the portion buried in the phosphor 11.

In the present variation, the excitation light BLc incident on the light incident surface 11a is reflected off the dichroic films 16a provided on surfaces of the light transmissive members 116 that are the surfaces located in the phosphor 11. Specifically, the excitation light BLc passes through the light transmissive members 116, which protrude above the light incident surface 11a, and reaches the dichroic films 16a. Since the dichroic films 16a each have a convex curved surface that follows the shape of the surface of the corresponding light transmissive member 116, the excitation light BLc reflected off the dichroic film 16a scatters (blue scattered light BLc1).

In the present variation, the amount of buried light transmissive members 116 is so adjusted that the amount of spherical light transmissive members 116 protruding above the light incident surface 11a is about half the entire spherical light transmissive members 16 or smaller. The thus buried light transmissive members 116 can prevent an excessive range over which the blue scattered light BLc1 is scattered by the surfaces of the light transmissive members 16 (dichroic films 16a) located in the phosphor 11. The blue scattered light BLc1 therefore efficiently enters the pickup system 127, whereby the excitation light can be used with improved efficiency.

The wavelength conversion element 310 according to the present variation is produced, for example, by using the following method.

The light transmissive members 116 are buried in a phosphor material formed by molding YAG phosphor particles; recesses are formed; the light transmissive members 116 are then temporarily removed; and the phosphor material is sintered. After the sintering, the light transmissive members 116 are disposed in the recesses again. The wavelength conversion element 310 according to the present variation is thus completed.

The dichroic films 16a are formed on the light transmissive members 116, for example, by coating the dichroic films 16a via a mask on the plurality of light transmissive members 116 disposed in the substrate.

The wavelength conversion element 310 according to the present variation can also provide the same effects as those provided by the wavelength conversion element 110 according to the first embodiment. The configuration in the present variation may be applied to the phosphor 211 in the second embodiment.

Second Variation

A wavelength conversion element according to a second variation will subsequently be described. The present variation relates to another variation of the wavelength conversion element 110 according to the first embodiment. Components common to those in the first embodiment have the same reference characters and will not be described in detail.

Figure 13:
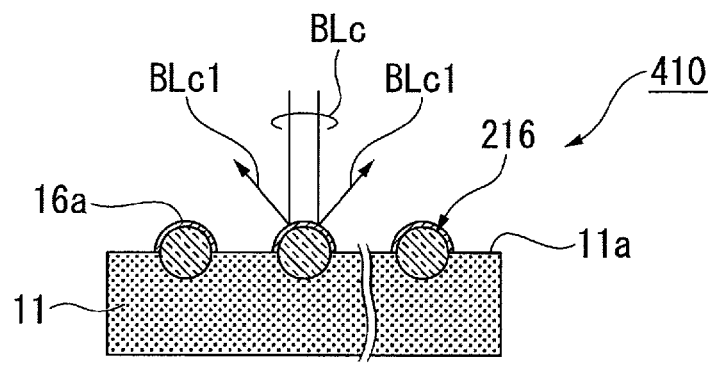
FIG. 13 is a cross-sectional view showing the configuration of key parts of a wavelength conversion element according to a second variation.

FIG. 13 is a cross-sectional view showing the configuration of key parts of a wavelength conversion element 410 according to the second variation.

The wavelength conversion element 410 according to the second variation includes a plurality of light transmissive members 216 in the light incident surface 11a of the phosphor 11, as shown in FIG. 13. The light transmissive members 216 are made of the same material of which the light transmissive members 16 in the first embodiment are made.

The dichroic film 16a is provided on part of the surface of each of the light transmissive members 216. The dichroic film 16a is provided on a portion of each of the light transmissive members 216 that is the portion exposed through the light incident surface 11a of the phosphor 11.

In the present variation, the excitation light BLc incident on the light incident surface 11a is reflected as scattered light (blue scattered light BLc1) off the dichroic films 16a provided on surfaces of the light transmissive members 216 that are the surfaces that protrude beyond the light incident surface 11a.

To produce the wavelength conversion element 410 according to the present variation, for example, the light transmissive members 216 are buried in the phosphor material formed by molding YAG phosphor particles, and the resultant structure is sintered. Subsequently, the dichroic films 16a are selectively coated on portions of the plurality of light transmissive members 216 buried in the light incident surface 11a that are the portions exposed through the light incident surface 11a by using a mask.

The light transmissive members 216, which contains the aluminum oxide have a high melting point and can therefore be sintered along with the phosphor particles.

The wavelength conversion element 410 according to the present variation can also provide the same effects as those provided by the wavelength conversion element 110 according to the first embodiment. The configuration in the present variation may be applied to the phosphor 211 in the second embodiment.

Third Variation

A wavelength conversion element according to a third variation will subsequently be described. The present variation relates to another variation of the wavelength conversion element 110 according to the first embodiment. Components common to those in the first embodiment have the same reference characters and will not be described in detail.

Figure 14:
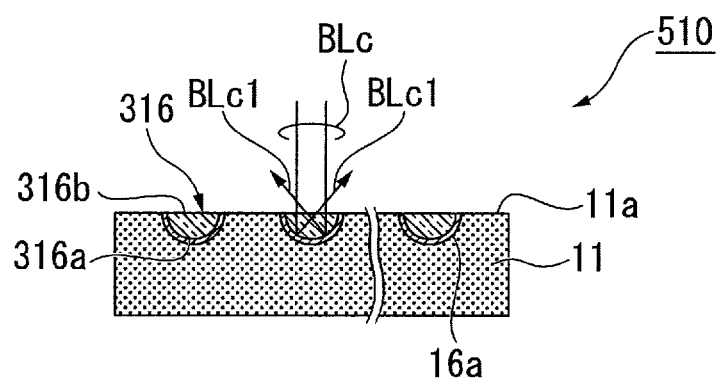
FIG. 14 is a cross-sectional view showing the configuration of key parts of a wavelength conversion element according to a third variation.

FIG. 14 is a cross-sectional view showing the configuration of key parts of a wavelength conversion element 510 according to the third variation.

The wavelength conversion element 510 according to the third variation includes a plurality of light transmissive members 316 in the light incident surface 11a of the phosphor 11, as shown in FIG. 14. The light transmissive members 316 in the present variation each have a semispherical shape and have a curved surface section 316a on one side of the semispherical shape and a flat section 361b on the other side thereof. The light transmissive members 316 are made of the same material of which the light transmissive members 16 in the first embodiment are made.

The light transmissive members 316 are each so configured that the curved surface section 361a is buried in the phosphor 11 and the flat section 361b is flush with the light incident surface 11a. In the present variation, the dichroic film 16a is provided on part of the surface of each of the light transmissive members 316. Specifically, the dichroic film 16a is provided on the surface of the curved surface section 316a.

In the present variation, the excitation light BLc incident on the light incident surface 11a is reflected off the dichroic films 16a provided on surfaces of the light transmissive members 316 that are the surfaces located in the phosphor 11. Specifically, the excitation light BLc passes through the flat sections 316, which are located on the other side of the light transmissive members 116 and flush with the light incident surface 11a, and reaches the dichroic films 16a. Since the dichroic films 16a each have a convex curved surface that follows the shape of the surface of the corresponding light transmissive member 316, the excitation light BLc reflected off the dichroic film 16a scatters (blue scattered light BLc1).

In the present variation, the size of the curved surface sections 316a of the light transmissive members 316 is so sized, provided that the light transmissive members 316 each have a spherical shape, as to be half the size of the spherical shape or smaller. The thus shaped light transmissive members 316 can prevent an excessive range over which the blue scattered light BLc1 is scattered by the surfaces of the light transmissive members 316 (dichroic films 16a) located in the phosphor 11. The blue scattered light BLc1 therefore efficiently enters the pickup system 127, whereby the excitation light can be used with improved efficiency.

The wavelength conversion element 510 according to the present variation can be manufactured by manufacturing the wavelength conversion element 110 according to the first embodiment or the wavelength conversion element 310 according to the first variation and then grinding portions of the light transmissive members 16 or 116 that are the portions protruding beyond the light incident surface 11a to the point where the ground surfaces are flush with the light incident surface 11a.

The wavelength conversion element 510 according to the present variation can also provide the same effects as those provided by the wavelength conversion element 110 according to the first embodiment. The configuration in the present variation may be applied to the phosphor 211 in the second embodiment.

Fourth Variation

A wavelength conversion element according to a fourth variation will subsequently be described. The present variation relates to another variation of the wavelength conversion element 110 according to the first embodiment. Components common to those in the first embodiment have the same reference characters and will not be described in detail.

Figure 15:
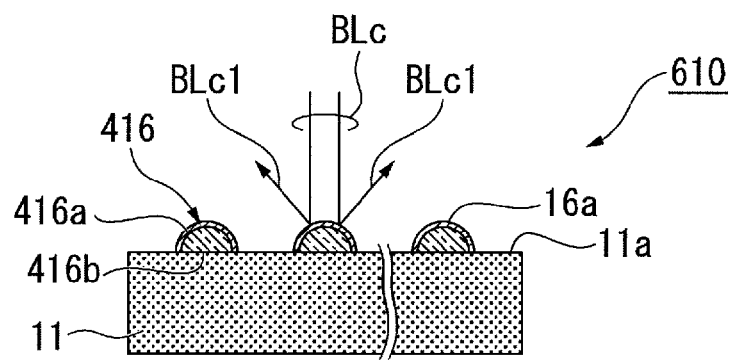
FIG. 15 is a cross-sectional view showing the configuration of key parts of a wavelength conversion element according to a fourth variation.

FIG. 15 is a cross-sectional view showing the configuration of key parts of a wavelength conversion element 610 according to the fourth variation.

The wavelength conversion element 610 according to the fourth variation includes a plurality of light transmissive members 416 in the light incident surface 11a of the phosphor 11, as shown in FIG. 15. The light transmissive members 416 in the present variation each have a semispherical shape and have a curved surface section 416a on one side of the semispherical shape and a flat section 461b on the other side thereof. The light transmissive members 416 are made of the same material of which the light transmissive members 16 in the first embodiment are made.

The flat sections 461b of the light transmissive members 416 are connected to the light incident surface 11a of the phosphor 11. In the present variation, the dichroic film 16a is provided on part of the surface of each of the light transmissive members 416. Specifically, the dichroic film 16a is provided on the surface of the curved surface section 416a.

In the present variation, the excitation light BLc incident on the light incident surface 11a is reflected as scattered light (blue scattered light BLc1) off the dichroic films 16a provided on surfaces of the light transmissive members 416 that are the surfaces that protrude above the light incident surface 11a.

The wavelength conversion element 610 according to the present variation can also provide the same effects as those provided by the wavelength conversion element 110 according to the first embodiment. The configuration in the present variation may be applied to the phosphor 211 in the second embodiment.

In the above embodiments and variations of the invention, the case where the illuminator is incorporated in a projector is presented by way of example, but not necessarily. The illuminator according to any of the embodiments and variations of the invention may be used as a lighting apparatus, a headlight of an automobile, and other apparatuses.

The entire disclosure of Japanese Patent Application No. 2018-037869, filed on Mar. 2, 2018 is expressly incorporated by reference herein.

What is claimed is:

1. A wavelength conversion element comprising:
a wavelength conversion layer that has a light incident surface on which excitation light is incident and converts the excitation light in terms of wavelength into fluorescence; and
a plurality of light transmissive members each having a curved surface and disposed in the light incident surface, the plurality of light transmissive members being separated from each other,
wherein the curved surfaces reflect the excitation light and transmit the fluorescence.

2. The wavelength conversion element according to claim 1,
wherein the curved surface of each of the light transmissive members is so provided as to protrude in a direction opposite a direction in which the excitation light incident on the light incident surface is incident.

3. The wavelength conversion element according to claim 1,
wherein the curved surface of each of the light transmissive members is provided in the wavelength conversion layer.

4. The wavelength conversion element according to claim 1,
wherein the light transmissive members are made of a material containing an aluminum oxide.

5. The wavelength conversion element according to claim 1,
wherein the light transmissive members each have a spherical shape.

6. An illuminator comprising:
the wavelength conversion element according to claim 1; and
a light source that outputs the excitation light.

7. An illuminator comprising:
the wavelength conversion element according to claim 2; and
a light source that outputs the excitation light.

8. An illuminator comprising:
the wavelength conversion element according to claim 3; and
a light source that outputs the excitation light.

9. An illuminator comprising:
the wavelength conversion element according to claim 4; and
a light source that outputs the excitation light.

10. An illuminator comprising:
the wavelength conversion element according to claim 5; and
a light source that outputs the excitation light.

11. A projector comprising:
the illuminator according to claim 6;
a light modulator that modulates light from the illuminator in accordance with image information to form image light; and
a projection system that projects the image light.

12. A wavelength conversion element comprising:
a wavelength conversion layer that has a light incident surface on which excitation light is incident and converts the excitation light in terms of wavelength into fluorescence; and
a plurality of light transmissive members each having a curved surface and disposed in the light incident surface, each of the plurality of light transmissive members being a sphere and having a portion buried in the wavelength conversion layer with the remaining portion exposed from the wavelength conversion layer,
wherein the curved surfaces reflect the excitation light and transmit the fluorescence.

13. The wavelength conversion element according to claim 12,
wherein the curved surface of each of the light transmissive members is so provided as to protrude in a direction opposite a direction in which the excitation light incident on the light incident surface is incident.

14. The wavelength conversion element according to claim 12,
wherein the curved surface of each of the light transmissive members is provided in the wavelength conversion layer.

15. The wavelength conversion element according to claim 12,
wherein the light transmissive members are made of a material containing an aluminum oxide.

16. An illuminator comprising:
the wavelength conversion element according to claim 12; and
a light source that outputs the excitation light.

17. The illuminator according to claim 16, further comprising:
a rotary driver that rotates a base that supports the wavelength conversion layer around a predetermined axis of rotation, the wavelength conversion layer being provided around the axis of rotation, reflectance of the excitation light being defined by the light transmissive members, a distribution of the reflectance being produced in a direction perpendicular to the axis of rotation;
a mover that moves the base in a direction perpendicular to the axis of rotation;
a detector that detects an amount of illumination light that is a combination of the reflected excitation light and the fluorescence; and
a controller that controls the mover based on a result of the detection performed by the detector.

18. An illuminator comprising:
a wavelength conversion element that comprises:
a wavelength conversion layer that has a light incident surface on which excitation light is incident and converts the excitation light in terms of wavelength into fluorescence, and
a plurality of light transmissive members each having a curved surface and disposed in the light incident surface, the curved surfaces reflecting the excitation light and transmitting the fluorescence;
a light source that outputs the excitation light;
a rotary driver that rotates a base that supports the wavelength conversion layer around a predetermined axis of rotation, the wavelength conversion layer being provided around the axis of rotation, reflectance of the excitation light being defined by the light transmissive members, a distribution of the reflectance being produced in a direction perpendicular to the axis of rotation;
a mover that moves the base in a direction perpendicular to the axis of rotation;
a detector that detects an amount of illumination light that is a combination of the reflected excitation light and the fluorescence; and
a controller that controls the mover based on a result of the detection performed by the detector.

19. A projector comprising:
the illuminator according to claim 18;
a light modulator that modulates light from the illuminator in accordance with image information to form image light; and
a projection system that projects the image light.

* * * * *